US006350093B1

(12) United States Patent
Petersen et al.

(10) Patent No.: US 6,350,093 B1
(45) Date of Patent: Feb. 26, 2002

(54) ELECTRICALLY INSULATED THREADED FASTENER ANCHOR

(75) Inventors: Rick W. Petersen; Steven R. Mattson, both of Spokane, WA (US)

(73) Assignee: CXT Incorporated, Spokane, WA (US)

( * ) Notice: Subject to any disclaimer, the term of this patent is extended or adjusted under 35 U.S.C. 154(b) by 0 days.

(21) Appl. No.: 09/677,479

(22) Filed: Oct. 2, 2000

(51) Int. Cl.$^7$ .............................. F16B 39/02; F16B 37/12
(52) U.S. Cl. ...................... 411/82.1; 411/178; 411/258; 411/903; 411/930; 52/704
(58) Field of Search .......................... 411/82, 82.1, 258, 411/178, 903, 930; 52/704

(56) References Cited

U.S. PATENT DOCUMENTS

| | | | |
|---|---|---|---|
| 3,418,781 A | * 12/1968 | Penote | ........................ 52/704 |
| 3,514,917 A | * 6/1970 | Merrill, Sr. | .................. 52/704 |
| 4,085,652 A | 4/1978 | Vanotti | |
| 4,195,709 A | 4/1980 | Gianotti et al. | |
| 4,840,524 A | * 6/1989 | Bisping et al. | ................ 411/82 |
| 4,912,826 A | * 4/1990 | Dixon et al. | .............. 411/82 X |
| 5,085,547 A | 2/1992 | Vanotti | |
| 5,641,256 A | 6/1997 | Gundy | |
| 5,740,651 A | 4/1998 | Vanotti | |

OTHER PUBLICATIONS

Pennrail Systems, Inc. publication showing prior art anchor insert which was on sale or in public use prior to Sep. 1, 1999.

* cited by examiner

Primary Examiner—Neill Wilson
(74) Attorney, Agent, or Firm—Wells, St. John, Roberts, Gregory & Matkin

(57) ABSTRACT

An electrically insulated anchor device is described, comprising a rigid elongated metal sleeve including an external surface that leads from an open top end to a bottom end. A longitudinal internal bore is formed within the sleeve with a bore wall spaced from the external surface by a sleeve wall thickness dimension. An electrically insulative polymer insert with an external surface engages the bore wall within the sleeve. The insert further includes a fastener receiving bore defined by a fastener receiving wall spaced from the external insert surface by an insert wall thickness dimension. The sleeve wall thickness dimension is substantially greater than the insert wall thickness dimension.

20 Claims, 5 Drawing Sheets

ELECTRICALLY INSULATED THREADED FASTENER ANCHOR

TECHNICAL FIELD

The present invention relates to anchors for securing screws in materials such as concrete and more particularly to electrically insulated threaded fastener anchors.

BACKGROUND OF THE INVENTION

It is often desirable to attach an article or device to a structure that is formed of a hard material such as concrete. To this end, there are various anchor arrangements made for insertion in pre-drilled holes that allow use of screw type fasteners. In some circumstances, however, it is desirable that the anchor be electrically insulated. For example, the metal rails of railways are often used to transmit electrical signals. It thus becomes necessary that the rails be electrically insulated from one another to avoid the potential of disrupting such signals.

Insulated threaded fastener anchors have been developed in which an electrically inslulative material, usually plastic, is used between the screw and substrate. In some forms of anchors, a polymer coating is disposed about the external surface of a metal anchor. The coating will function to insulate the encased anchor and screw, if the coating remains intact. However, it is not unusual that the coatings are scratched or chipped during installation of the anchor and the insulative quality is thereby compromised.

In another anchor form, a thin metal sleeve is provided around a plastic screw receiving insert that insulates the substrate from the screw. This type of anchor is more serviceable to provide insulating properties, but the holding strength desired to secure the screw is compromised.

Lateral stress applied against the screw will tend to work the insert and weaken the ability of the anchor to hold the screw against unintended withdrawal. Too frequently, the flexing anchor will break or crack the adjacent brittle substrate media.

Further, the typical prior forms of threaded anchors will typically include ribs spaced along the anchor sleeves for use to resist pulling forces exerted by the screw. Tension applied by tightening the screw within the anchor will result in radial outward forces being applied at stress risers created by the ribs. Thus, tension applied by the screw, or lateral shock loading can produce excessive forces at the stress concentrated areas, resulting in cracking or breakage of the substrate materials.

One of many examples of anchor sleeves that do not include an axially smooth outer surface is shown in U.S. Pat. No. 5,641,256 to Gundy. However, Gundy shows a sleeve that has both longitudinal and transverse ribs which are used to lock the sleeve in a casting. Gundy recognizes the problem of stress risers, or "fragile zones" created by the traditional ribbing on anchor members. The solution attempted by Gundy is to add more ridges extending longitudinally along the body of the anchor. The intersecting ridges, however, do not uniformly eliminate all stress risers, since annular ridges remain along the sleeve between the longitudinal ribs, and since the longitudinal ribs themselves create irregularities along the sleeve surface.

BRIEF DESCRIPTION OF THE DRAWINGS

Preferred embodiments of the invention are described below with reference to the following accompanying drawings.

DESCRIPTION OF THE PREFERRED EMBODIMENTS

Figure 1:
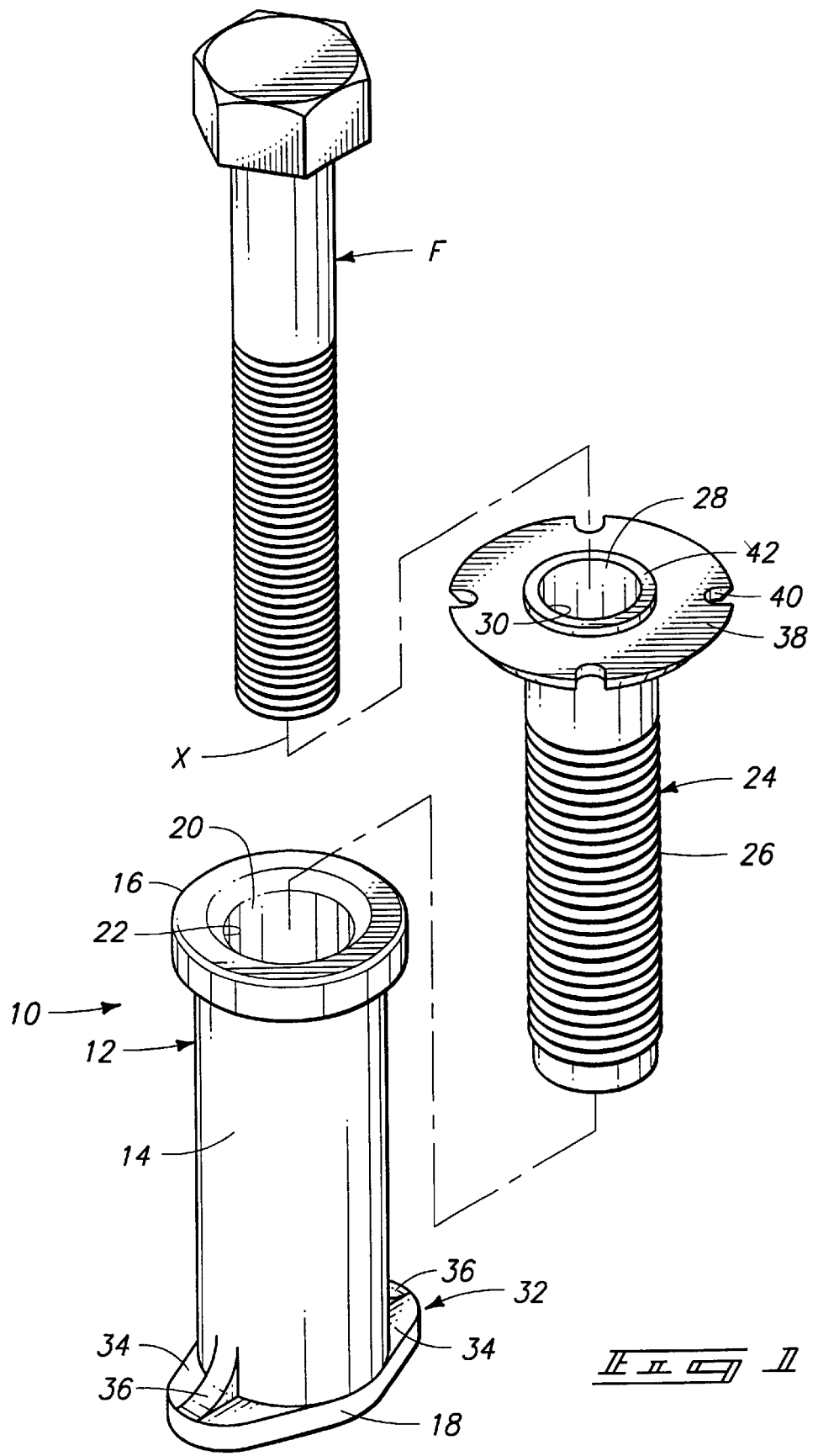
FIG. 1 is an exploded perspective view of a preferred electrically insluated screw anchor and a screw type fastener.
Figure 2:
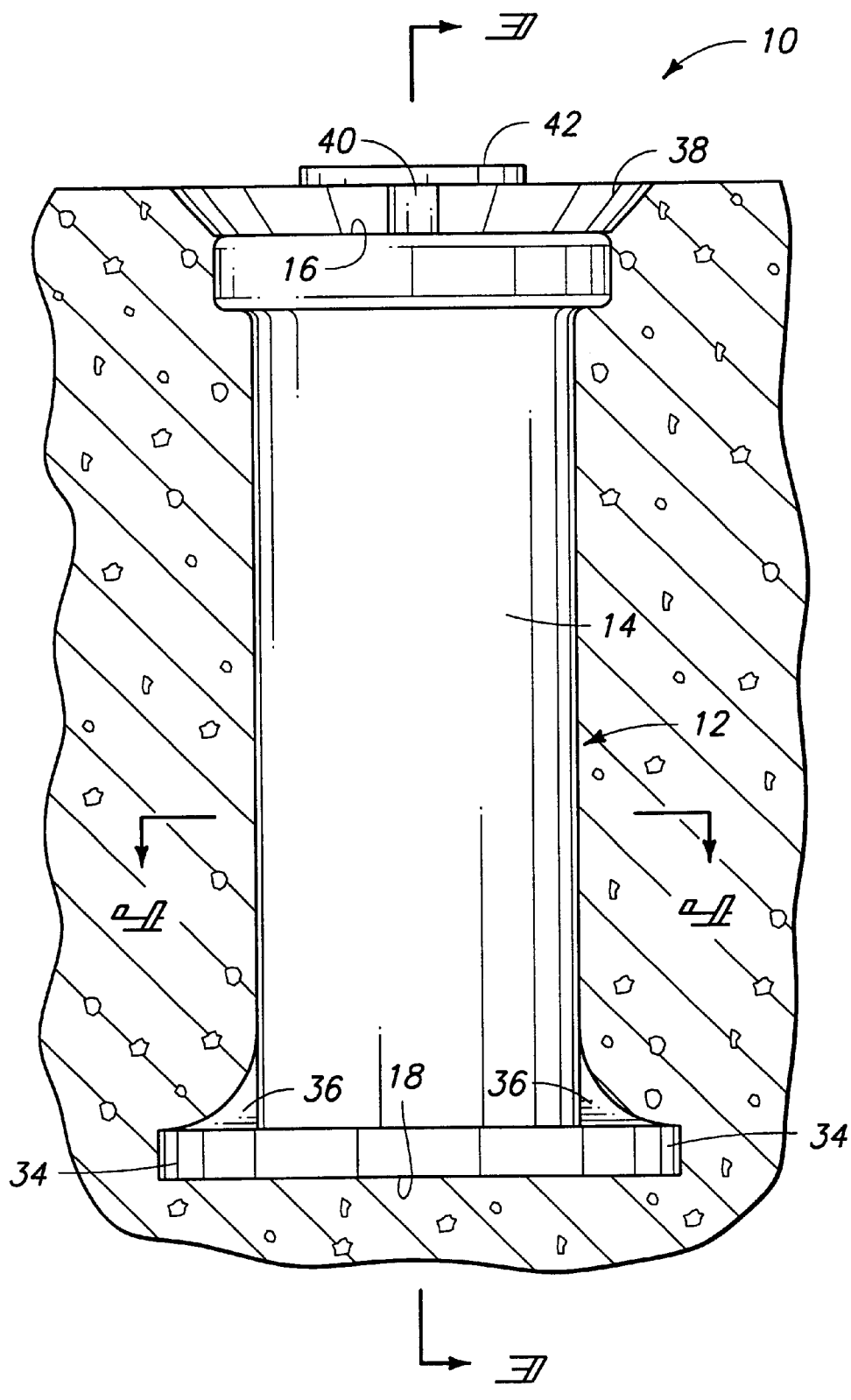
FIG. 2 is a side elevation view thereof.

This disclosure of the invention is submitted in furtherance of the constitutional purposes of the U.S. Patent Laws "to promote the progress of science and useful arts" (Article 1, Section 8).

GENERAL DESCRIPTION

Before presenting a detailed description of the invention, general descriptions will be given that relate to various aspects thereof.

In one aspect, the invention includes an electrically insulated anchor device which is generally referred to by the reference numeral 10. The electrically insulated anchor device 10 includes a rigid elongated metal sleeve 12 including an external surface 14 leading from an open top end 16 to a bottom end 18. A longitudinal internal bore 20 is formed within the sleeve 12. A bore wall 22 is spaced from the is external surface 14 by a sleeve wall thickness dimension T. An electrically insulative polymer insert 24 including an external insert surface 26 engages the bore wall 22 within the sleeve 12. The insert 24 further includes a fastener receiving bore 28 defined by a fastener receiving wall 30 that is spaced from the external insert surface 14 by an insert wall thickness dimension R. The sleeve wall thickness dimension T is greater than the insert wall thickness dimension R.

In another aspect, the present electrically insulated anchor device 10 includes a rigid elongated metal sleeve 12 formed along an axis X and including an axial length dimension L between an open top end 16 and a bottom end 18. The metal sleeve 12 includes a substantially axially smooth external surface 14 disposed between the top and bottom ends 16, 18. The substantially axially smooth external surface 14 includes an axial length dimension D that is greater than approximately one half of the length dimension L. The sleeve 12 includes a longitudinal insert receiving bore 20 formed within the sleeve. An electrically insulative polymer insert 24 releasably engages the sleeve 12 within the insert receiving bore 20 and includes a fastener receiving bore 28.

In a further aspect, the present anchor device 10 includes a rigid elongated metal sleeve 12 formed along an axis X and including a length dimension L between an open top end 16 and a bottom end 18. The metal sleeve 12 includes a substantially axially smooth external surface 26 disposed between the top and bottom ends 16, 18, and a longitudinal insert receiving bore 20 is disposed radially inward of the external surface 26. The substantially axially smooth external surface 14 extends at least approximately one half of the length dimension L of the sleeve. An anti-rotation surface 32 is formed along the sleeve along a portion thereof axially spaced from the external surface 14. An electrically insulative polymer insert 24 is disposed within the insert receiving bore and includes a fastener receiving bore 30 and an external sleeve engaging surface 26 received by the insert receiving bore 20 of the metal sleeve 12. The insert receiving bore 20 is defined by a bore wall 22 that is spaced from the external surface 14 by a sleeve wall thickness dimension T.

The fastener receiving bore 28 is defined by a fastener receiving wall 30 that is spaced from the external sleeve engaging surface 26 by an insert wall thickness dimension R. The sleeve wall thickness dimension T is greater than the insert wall thickness dimension R.

DETAILED EXAMPLES

Referring to FIG. 1 of the drawings, a preferred device 10 is shown for releasably receiving a screw type fastener F. The form of fastener may vary substantially from the example illustrated, as may the size and shape of the threads along the fastener shank. It should therefore be understood that the present device may be manufactured in various sizes, and with various forms of internal threads to accommodate a wide variety of fasteners and fastener sizes. Variance in fastener size and thread configuration may be understood by comparing FIGS. 1 and 6.

It should also be understood that the present device may be produced and distributed with or without a fastener F and that fasteners may be supplied separately from other sources.

FIG. 1 indicates the preferred separate nature of the metal sleeve 12 and the insert 24. The metal sleeve 12 in preferred forms releasably receives the insert 24, thereby allowing for interchangeability of inserts to accommodate different size or thread pattern fasteners using the same sleeve configuration.

In a preferred form, the sleeve 12 is made of a rigid metal such as ductile iron formed by casting or another appropriate metal forming technique such as machining, forging or a combination thereof.

The top end 16 of the sleeve 12 is open to receive the insert 24. It is preferred that the bottom end 18 also be open, but alternate configurations could include closed or partially closed bottom ends if desired. The internal insert receiving bore 20 will therefore extend at least partially through the overall length L of the sleeve between ends 16 and 18.

In preferred forms, the axially smooth external surface 14 extends along the sleeve 12 between the top and bottom ends, through a length dimension D that is greater than approximately one half of the length dimension L.

As used herein "axially smooth" means a substantially continuous surface that is not ribbed or provided with ridges, or other raised surfaces that could cause stress risers in adjacent casting material. This is a departure from known forms of anchors. The preferred "axially smooth" surface is significantly different than anchors which typically intentionally include ribs that are used to enhance radial expansion of the anchored sleeve and assure the anchoring effect in cast materials.

The term "axially smooth" is also meant to include surfaces that may be, but that are not necessarily, cylindrical. For example, a surface of eliptical cross section (taken transverse to the long axis X) could also effectively be "axially smooth" so long as there are no abrupt changes to the shape along the sleeve axis, preferably over a distance greater than one half of the sleeve length. Geometric shapes might also be used if the corners joining flat sides are smoothly rounded to at least minimize stress risers running lengthwise along the sleeve.

It is preferred that the axially smooth external surface 14 occupy a significant portion of the overall sleeve length to avoid creation of stress risers or areas that create stress concentrations when lateral loading is applied to the sleeve against surrounding media (such as concrete). It has been found, for example, that raised ribs or ridges along a sleeve will produce weak areas or stress risers in adjacent media, increasing the possibility for fracture or "blow-out" of adjacent media when lateral loading is placed on the screw type fastener. The advantage previously thought to be gained from use of such irregular surfaces (increasing resistance to axial pull-out) has been found to be compromised by the increased tendency for lateral fracture. The axially smooth surface substantially eliminates stress risers or areas of weakness along a substantial part of the sleeve length and thereby reduces the potential of "blow-out".

Resistance to axial tension or pull-out is provided in preferred forms of the device 10 by the anti-rotation surface 32, formed on the sleeve adjacent to the external surface 14, and most preferably at the bottom end 18. The surface 32 may be comprised of a lug or, more preferably, a pair of lugs 34 formed on the sleeve at the bottom end thereof, and projecting outwardly with respect to the external surface of the sleeve. The lugs will resist pull-out of the sleeve when set in media such as concrete. Further, the anti-rotation surface may be provided in the form of fillets 36 that are formed between the lugs 34 and sleeve body to reinforce the lugs and to further resist rotation of the sleeve about the axis X when the sleeve is set in media such as concrete.

It is recognized that the lugs 34 will produce stress risers. However, the risers will occur at the deepest penetration of the anchor in the surrounding media. Also, a lateral force applied at the headed end of the fastener will be diminished at the bottom end of the sleeve where the stress risers occur.

It is also noted that the lugs 34 are not annular about the axis X (see FIG. 1). This is done to provide clearance along sides of the sleeve for reinforcing strands that may be used in the surrounding media. In concrete railroad ties, for example, pre-stressed wire is almost universally used to strengthen the ties. If the lugs were continuous about the sleeve, contact could be made between the lugs and reinforcing wires. Shaping the lugs substantially as shown provides clearance for the sleeve to be fitted between adjacent reinforcing wires.

In preferred forms, the internal bore 20 is centered on the axis X and is defined by the bore wall 22. It is preferred that the bore wall be threaded to threadably receive the insert 24. The threads may be of a conventional form, and be shaped by conventional techniques.

The insert is most preferably formed of a polymer that includes electrically insulative properties. A fastener received within the insert will thus be electrically insulated from the sleeve and any materials (such as reinforcing wire) in contact with the sleeve. In preferred forms, the insert is formed of an injection molded nylon, though other insulative materials and forming processes could also be used.

In preferred forms, a threaded coupling between the sleeve 12 and insert 24 enables selective removal of the insert should it become worn, broken, or stripped. It is preferable that the internal threaded bore diameter of the sleeve be slightly greater than the outside diameter of the insert to accommodate expansion and contraction in freeze-thaw conditions, especially if water is present between the insert and sleeve. In one example, such a diameter difference may be approximately 0.010 inches.

Figure 3:
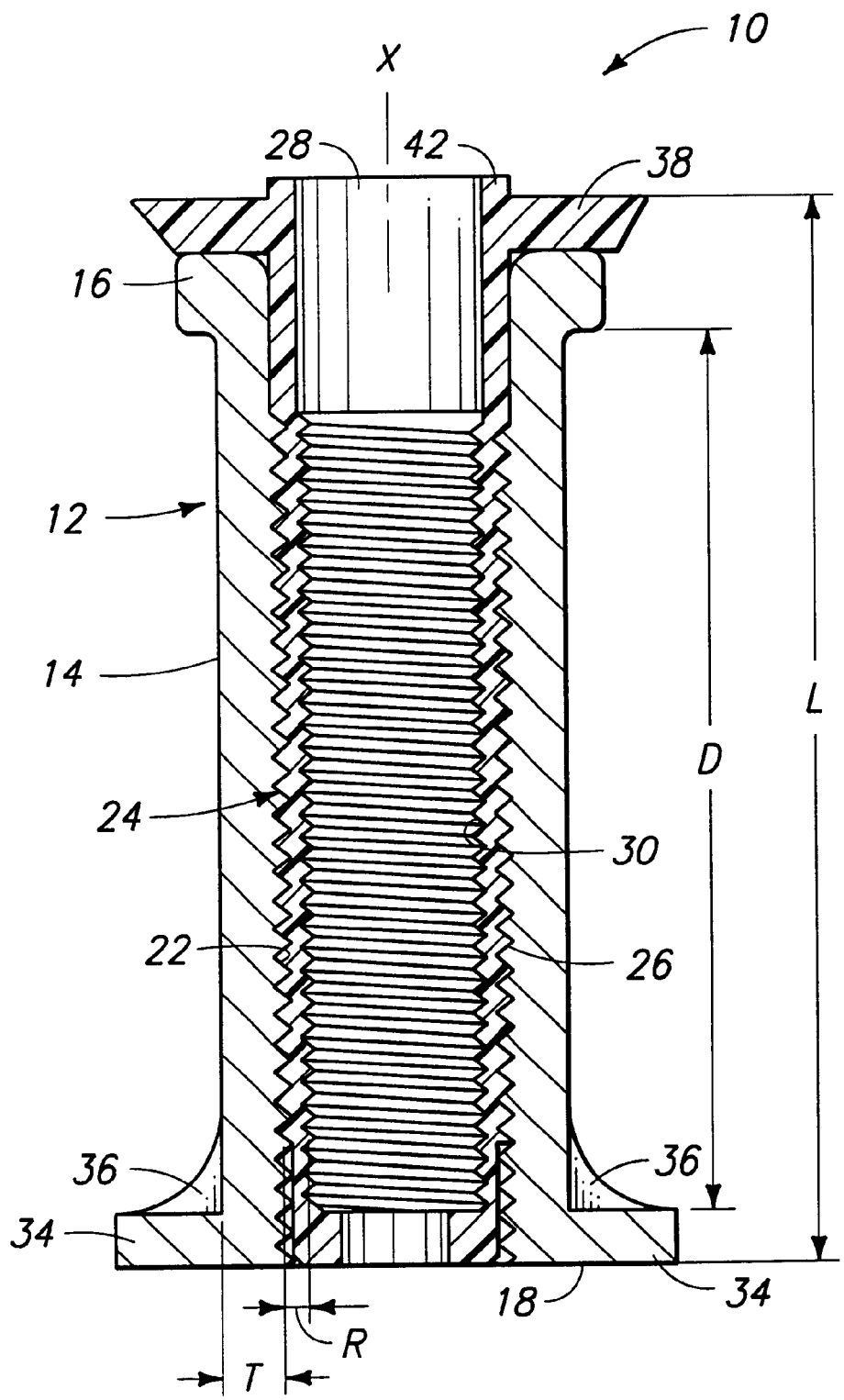
FIG. 3 is an enlarged sectioned view taken substantially along line 3—3 in FIG. 2 and showing the anchor set in concrete.
Figure 4:
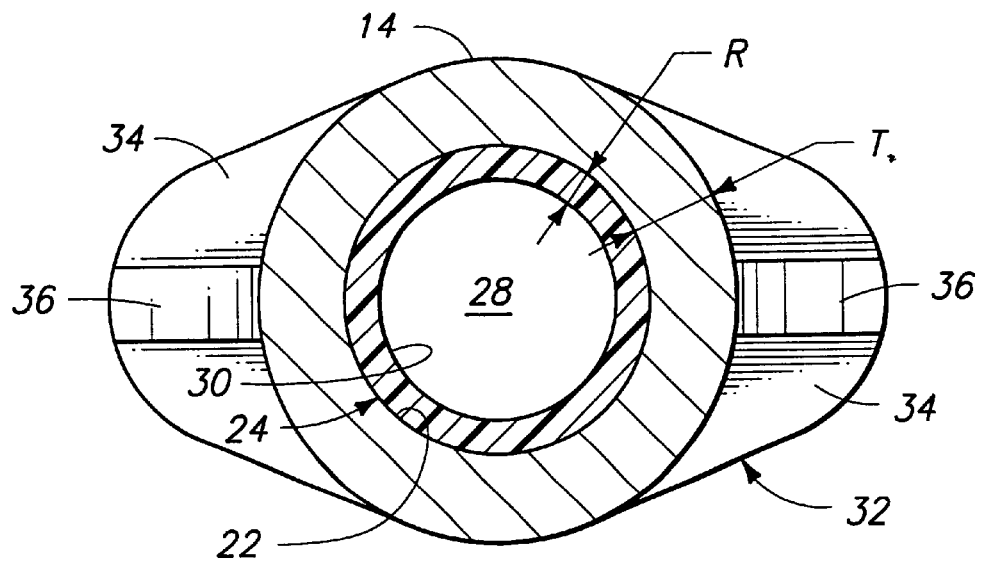
FIG. 4 is a transverse sectional view taken substantially along line 4—4 in FIG. 2.
Figure 5:
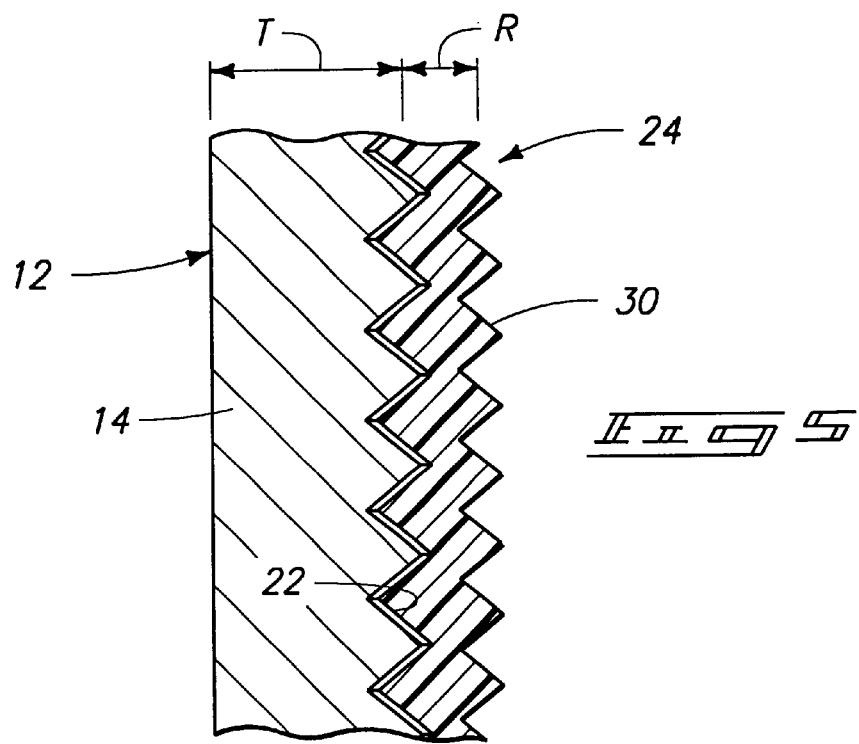
FIG. 5 is an enlarged detail view showing comparative wall thickness measurements.
Figure 6:
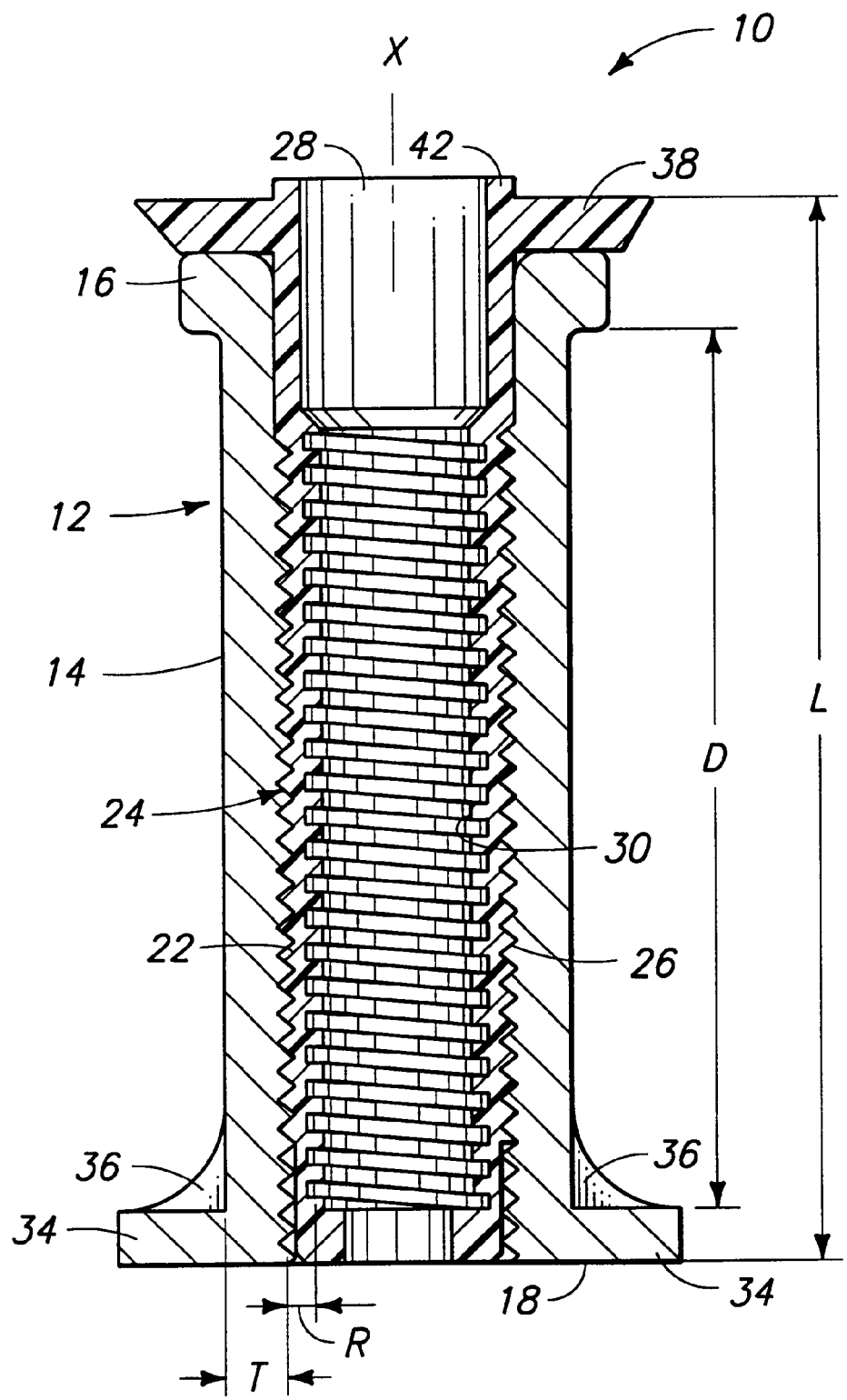
FIG. 6 is a sectioned view of an insert configured to receive an alternate form of fastener.

The threaded coupling also enables interchangeability of different inserts in commonly shaped sleeves. For example, FIGS. 3 and 6 show different inserts used in the same sleeve. Thus, a single sleeve may be used to receive any one of several inserts configured to receive different fasteners.

The insert 24 most preferably includes the bore 28 for receiving the fastener F. It is preferable that the bore be centered on the axis X, forming the insert wall thickness R between the bore wall 22 and the external surface 26.

The sleeve thickness T (between the axially smooth surface and the bore wall 22) is substantially greater than the thickness R of the insert 24. In preferred forms, the thickness dimension R is approximately one-half of the sleeve thickness T. This is done to provide maximum rigidity along the insert and to provide resistance to radial expansion or contraction of the sleeve in response to tightening of the fastener F in the insert 24 and against compression developed by the surrounding media. The sleeve 12 will thus prevent bending or breakage of the insert 24.

The insert 24 preferably extends the full length of the sleeve 12 to provide full and intimate contact with the fastener. The bottom end of the sleeve may be open to allow for drainage, or be fitted with an appropriate plug (not shown) if desired. The top end of the sleeve is preferably provided with an annular flange 38 overlapping the top end of the sleeve.

It is preferable that the flange 38 extend beyond the top end 16 of the sleeve to protect against moisture or debris gathering between the sleeve and insert below. It is also preferable that the flange include a tool engagement surface 40. As exemplified, the surface 40 may be provided in the form of recesses for reception of a spanner wrench to facilitate insertion and removal of the insert into and from the sleeve.

A thin raised rim 42 may also be provided at the top end of the sleeve to engage a headed end of a fastener and provide a sealing surface that may compress axially when the fastener is tightened, thereby sealing the area between the fastener shank and the wall of the insert bore 28. The rim 42 also helps to prevent water from entering the insert.

The bore 28 of the insert 24 may be threaded to accommodate a threaded fastener F. The nature and size of the threads may vary while the external threads along the external surface 26 may remain constant and of a prescribed diameter. Thus, inserts having common outside diameters but different bore diameters and threads may be interchanged in a single sleeve 12. For example, an insert provided with a bore diameter and threads to fit a ⅞ UNC bolt fastener could be interchanged within the same sleeve 12 with an insert having, say a 22-millimeter fastener with square threads. The external surface 26 of both fasteners could be similar and threaded to removably fit within the same metal sleeve 12.

In operation, a selected sleeve 12 may be positioned in a mold while a hardenable media such as concrete is poured to encase the external surface 12. Once the media hardens, the sleeve 12 will be captured against rotation by provision of the lugs 34, and against pull-out by provision of the same lugs. An insert 24, selected to accommodate a particular fastener F, may be placed within the sleeve by threaded engagement therewith. This may be accomplished either before or after placement of the sleeve within the mold. Once the media has hardened, the fastener may be inserted into the insert bore 28 or removed at will.

Once in place within the media, the lugs 34 will prevent the sleeve 12 from rotating in response to rotation of the fastener. Further, the lugs will prevent the sleeve from being pulled out of the media. The insert, being formed of an electrically insulative material, will electrically isolate the fastener from the sleeve 12 and the surrounding media. The sleeve, being rigid and of a thickness substantially greater than the thickness R of the insert, will protect the insert from expanding in response to tightening of the fastener or contracting in response to compressive forces applied by the surrounding media. No stress risers will be produced along the length of the axially smooth surface, so lateral forces applied against the fastener or sleeve will not likely result in break-out of the surrounding media.

In use, the non-similar materials of the sleeve and insert may withstand significant side loading, thereby preventing media blow-out. Further, the thick, rigid walls of the sleeve prevent bending or fracture of the insert. If a fastener of different diameter or thread configuration is to be used, the insert 24 may be removed and replaced with an insert, matching the different diameter or thread configuration of another form of fastener. Further, if the insert becomes damaged, replacement thereof with an additional insert may be accomplished without disturbing or requiring replacement of the sleeve 12.

Lateral loading applied against a fastener received within the bore 28 will be met with bending resistance of the heavy walled sleeve, while the insert electrically isolates the fastener. If lateral shock loading is applied against the fastener, the sleeve will absorb some of the forces by reason of the polymer insert and rigidity of the sleeve. The axially smooth external surface 14 of the sleeve preferably functions to eliminate stress risers or weak areas along the length of the insert 12, thereby preventing or at least minimizing the chance that the surrounding media will crack or blow-out.

The polymer insert will function to prevent corrosion of the fastener, and will thereby facilitate later removal of the insert using simple tools, all while the sleeve remains embedded within the surrounding media.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrically insulated anchor device, comprising:
   a rigid elongated metal sleeve including an external surface leading from an open top end to a bottom end;
   a longitudinal internal bore formed within the sleeve and including a bore wall spaced from the external surface by a sleeve wall thickness dimension;
   an electrically insulative polymer insert including an external insert surface engaging the bore wall within the sleeve;
   the insert further including a fastener receiving bore defined by a fastener receiving wall spaced from the external insert surface by an insert wall thickness dimension; and
   wherein the sleeve wall thickness dimension is substantially greater than the insert wall thickness dimension.

2. An electrically insulated anchor device as defined by claim 1 wherein the insert is threadably engaged with the sleeve.

3. An electrically insulated anchor device as defined by claim 1 further comprising an anti-rotation surface formed on the sleeve.

4. An electrically insulated anchor device as defined by claim 1 further comprising an anti-rotation lug formed on the sleeve, and projecting outwardly from the external surface of the sleeve.

5. An electrically insulated anchor device as defined by claim 1 further comprising an anti-rotation lug formed on the sleeve at the bottom end thereof, and projecting outwardly from the external surface of the sleeve.

6. An electrically insulated anchor device as defined by claim 1 wherein the insert wall thickness dimension is approximately one-half of the sleeve wall thickness dimension.

7. An electrically insulated anchor device, comprising:
   a rigid elongated metal sleeve including an external surface leading from an open top end to a bottom end;
   a longitudinal internal bore formed within the sleeve and including a bore wall spaced from the external surface by a sleeve wall thickness dimension;

an electrically insulative polymer insert including an external insert surface engaging the bore wall within the sleeve;

the insert further including a fastener receiving bore defined by a fastener receiving wall spaced from the external insert surface by an insert wall thickness dimension;

wherein the sleeve wall thickness dimension is substantially greater than the insert wall thickness dimension; and an anti-rotation lug formed on the sleeve at the bottom end thereof, and projecting outwardly from the external surface of the sleeve.

8. An electrically insulated anchor device, comprising:

a rigid elongated metal sleeve including an external surface leading from an open top end to a bottom end;

a longitudinal internal bore formed within the sleeve and including a bore wall spaced from the external surface by a sleeve wall thickness dimension;

an electrically insulative polymer insert including an external insert surface engaging the bore wall within the sleeve;

the insert further including a fastener receiving bore defined by a fastener receiving wall spaced from the external insert surface by an insert wall thickness dimension;

wherein the sleeve wall thickness dimension is substantially greater than the insert wall thickness dimension; and wherein the insert wall thickness dimension is approximately one-half of the sleeve wall thickness dimension.

9. An electrically insulated anchor device, comprising:

a rigid elongated metal sleeve including an external surface leading from an open top end to a bottom end;

a longitudinal internal bore formed within the sleeve and including a bore wall spaced from the external surface by a sleeve wall thickness dimension;

an electrically insulative polymer insert including an external insert surface engaging the bore wall within the sleeve;

the insert further including a fastener receiving bore defined by a fastener receiving wall spaced from the external insert surface by an insert wall thickness dimension;

wherein the sleeve wall thickness dimension is substantially greater than the insert wall thickness dimension; and wherein the insert includes a flange at a top end thereof, overlapping the top end of the sleeve.

10. An electrically insulated anchor device, comprising:

a rigid elongated metal sleeve formed along an axis and including an axial length dimension between an open top end and a bottom end;

the metal sleeve including a substantially axially smooth external surface disposed between the top and bottom ends;

wherein the substantially axially smooth external surface includes an axial length dimension that is greater than approximately one-half of the length dimension;

a longitudinal insert receiving bore formed within the sleeve; and an electrically insulative polymer insert releasably engaging the sleeve within the insert receiving bore and including a fastener receiving bore.

11. An electrically insulated anchor device as defined by claim 10 wherein the external surface is substantially concentric with the axis.

12. An electrically insulated anchor device as defined by claim 10 wherein the external surface is substantially cylindrical along the axis.

13. An electrically insulated anchor device as defined by claim 10 further comprising an anti-rotation surface formed on the sleeve.

14. An electrically insulated anchor device as defined by claim 10 further comprising an anti-rotation surface comprised of a lug formed on the sleeve at the bottom end thereof, and projecting outwardly from the external surface of the sleeve.

15. An electrically insulated anchor device, comprising:

a rigid elongated metal sleeve formed along an axis and including a length dimension between an open top end and a bottom end;

the metal sleeve including a substantially axially smooth external surface disposed between the top and bottom ends, and a longitudinal insert receiving bore disposed radially inward of the external surface;

wherein the substantially axially smooth external surface extends at least approximately one-half of the length dimension of the sleeve;

an anti-rotation surface formed along the sleeve along a portion thereof axially spaced from the external surface;

an electrically insulative polymer insert disposed within the insert receiving bore and including a fastener receiving bore and an external sleeve engaging surface received by the insert receiving bore of the metal sleeve;

wherein the insert receiving bore is defined by a bore wall spaced from the external surface by a sleeve wall thickness dimension;

wherein the fastener receiving bore is defined by a fastener receiving wall spaced from the external sleeve engaging surface by an insert wall thickness dimension; and wherein the sleeve wall thickness dimension is greater than the insert wall thickness dimension.

16. An electrically insulated anchor device as defined by claim 15 wherein the anti-rotation surface is comprised of a lug projecting outwardly with respect to the external surface of the sleeve.

17. An electrically insulated anchor device as defined by claim 15 wherein the anti-rotation surface is comprised of a lug formed on the sleeve at the bottom end thereof, and projecting outwardly with respect to the external surface of the sleeve.

18. An electrically insulated anchor device as defined by claim 15 wherein the insert includes a flange at a top end thereof, overlapping the top end of the sleeve and including a removal tool engaging surface thereon to facilitate manual removal of the insert from the sleeve.

19. An electrically insulated anchor device as defined by claim 15 wherein the bore wall of the sleeve is threaded and the insert is threadably engaged within the bore of the sleeve.

20. An electrically insulated anchor device as defined by claim 15 wherein the metal sleeve is formed of a rigid ferrous metal and the electrically insulative polymer is nylon.

* * * * *